June 24, 1930.　　A. G. CARTER　　1,765,403
WHEEL OR PULLEY FOR BAND SAWS
Filed July 20, 1929
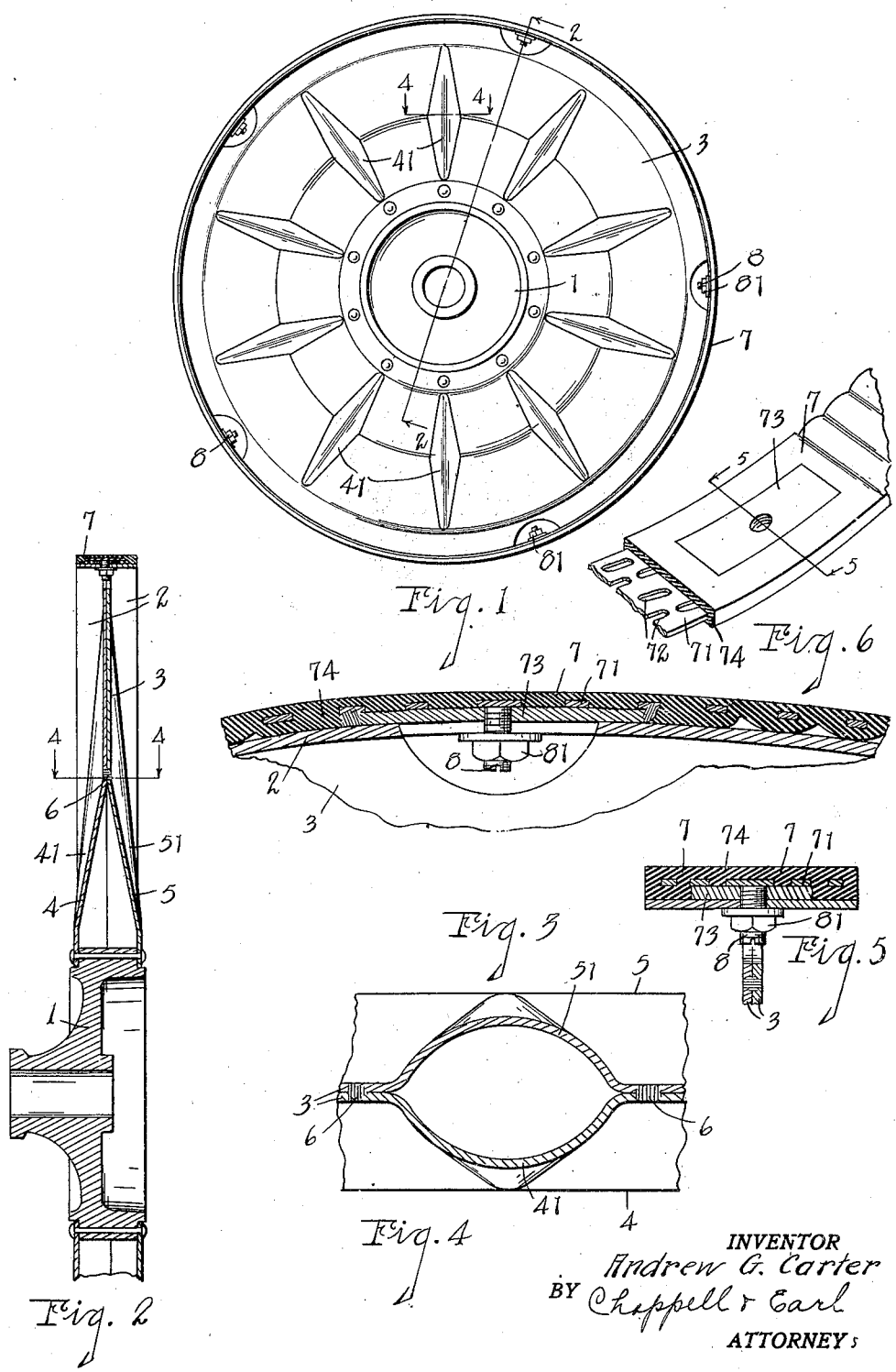
INVENTOR
Andrew G. Carter
BY Chappell & Earl
ATTORNEYS Patented June 24, 1930

1,765,403

UNITED STATES PATENT OFFICE

ANDREW G. CARTER, OF GRAND RAPIDS, MICHIGAN, ASSIGNOR TO THE CARTER PRODUCTS COMPANY, INC., OF GRAND RAPIDS, MICHIGAN

WHEEL OR PULLEY FOR BAND SAWS

Application filed July 20, 1929. Serial No. 379,690.

This invention relates to an improved wheel or pulley for band saws.

The objects of the invention are:

First, to provide an improved perfectly balanced sheet metal band saw wheel of great strength in proportion to its weight.

Second, to provide an improved construction of sheet metal band saw wheel that insures rigidity and balance.

Third, to provide such a wheel with an improved tire structure.

Fourth, to provide such a wheel with an improved cushion structure and attaching means therefor.

Objects pertaining to details and economies of construction and operation will definitely appear from the description to follow. A preferred embodiment of my improved band saw wheel is illustrated in the accompanying drawing, in which:

Fig. 1 is an elevation view of a band saw wheel embodying the features of my invention.

Fig. 2 is an enlarged detail sectional view on line 2—2 of Fig. 1, the lower portion being omitted.

Fig. 3 is an enlarged detail central sectional view through one of the attaching plates and attaching screw means, the attaching screw and nut being shown in full lines and the form of cushion sections appearing in section.

Fig. 4 is an enlarged detail transverse sectional view on line 4—4 of Figs. 1 and 2, showing details of the radially raised ribs in the sheet metal web structure.

Fig. 5 is an enlarged detail transverse sectional view on line 2—2 of Fig. 1 and line 5—5 of Fig. 6, showing the tire structure and attaching means.

Fig. 6 is a detail perspective view of a broken section of the tire with core projecting, showing the perforations therein and the form of the inner surface of the cushion.

The parts will be identified by their numerals of reference which are the same in all the views.

1 is the metal hub of the wheel. 2 is a plane flat metal rim for the wheel, formed in symmetrical halves integral with the wheel web plates. 3 is the web of the wheel made up of opposed symmetrical disks of sheet metal 4 and 5 each of which is provided with radial struck up ribs 41 and 51 respectively. The flat portions between these ribs are joined by electrical spot welds 6, see particularly Figs. 2 and 4, and the peripheries of each disk are outturned to form the flat metal rim as stated.

7 is the reinforced rubber tire structure which is made up of a central metal band 71 which is perforated by a series of longitudinally elongated perforations 72 in diagonal transverse rows across the same. The successive rows are staggered. Supporting plates 73 are suitably welded to the interior of the supporting band and are each provided with a screw threaded hole at the center for attaching the tire. The central band is embraced by vulcanized rubber 74 both inside and out, the same being forced through the perforations and vulcanized in place, as seen in Fig. 3, and consequently very strongly retained upon this central reinforcing band core. On the inner surface between the supporting plates, the rubber cushion is formed in scallop-form sections of cushions with rounded surface inward.

The tire fits the rim very closely. The web of the wheel is cut away within the rim to form semi-circular recesses opposite the supporting plates and a perforation is formed in the rim to receive the stud screws 8 for securing the same in position. These screws bottom into the plate against the core band. On each screw is a nut 81 for clamping. It will be seen that, by adjusting the nuts 81, any slight irregularity in the wheel is overcome and perfect adjustment and circle and consequent balance of the wheel is secured. This is further insured by the scalloped form of the inner surface of the cushion.

I have produced a band saw wheel in the form specially preferred by me and I wish to claim the same specifically. I also desire to claim the invention broadly as pointed out in the appended claims.

Having thus described my invention, what

I claim as new and desire to secure by Letters Patent, is:

1. In a band saw wheel, the combination of a suitable hub, a web for the wheel made up of opposed identical disk plates of sheet metal formed with opposed struck up radial ribs the peripheries of which disks are outturned to form the opposed halves of a flat metal rim, semi-circular cuts being made at intervals in the web within the rim, a reinforced cushion tire therefor comprising a central band with staggered longitudinal rows of perforations therein and with attaching plates secured to the interior of said band and having screw threaded holes at the center, a vulcanized rubber tread embracing the said reinforcing band and projecting through the perforations therein, and stud screws disposed through the rim of the said wheel at the semi-circular cuts bottomed into said attached plates, and clamp nuts on said screws.

2. In a band saw wheel, the combination of a suitable hub, a web for the wheel made up of opposed identical disk plates of sheet metal formed with opposed struck up radial ribs the peripheries of which disks are outturned to form the opposed halves of a flat metal rim, semi-circular cuts being made at intervals in the web within the rim, a reinforced cushion tire therefor comprising a central band with staggered longitudinal rows of perforations therein and with attaching plates secured to the interior of said band and having screw threaded holes at the center, vulcanized rubber tread with scalloped inner surface embracing the said reinforcing band and projecting through the perforations therein, stud screws disposed through the rim of the said wheel at the semi-circular cuts bottomed into said attached plates, and clamp nuts on said screws.

3. In a band saw wheel, the combination of a suitable hub, a web for the wheel made up of opposed identical disk plates of sheet metal formed with opposed struck up radial ribs the peripheries of which disks are outturned to form the opposed halves of a flat metal rim, a reinforced cushion tire therefor comprising a central band with transverse rows of perforations therein and with attaching plates secured to the interior of said band and having screw threaded holes at the center, vulcanized rubber tread with scalloped inner surface embracing the said reinforcing band and projecting through the perforations therein, and screws disposed through the rim of the said wheel into said attached plates.

4. In a band saw wheel, the combination of a suitable hub, a web for the wheel made up of opposed identical disk plates of sheet metal formed with opposed struck up radial ribs the peripheries of which disks are out-turned to form the opposed halves of a flat metal rim, and semi-circular cuts at intervals in the web within the rim, and attaching screws disposed therein.

In witness whereof I have hereunto set my hand.

ANDREW G. CARTER.